(12) United States Patent
Cheng et al.

(10) Patent No.: US 6,695,435 B1
(45) Date of Patent: Feb. 24, 2004

(54) SELECTIVE REPLACEMENT FOR ARTIFACT REDUCTION

(75) Inventors: Hui Cheng, Bridgewater, NJ (US); Beilei Xu, Penfield, NY (US); Elliott A. Eklund, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/448,135

(22) Filed: May 30, 2003

(51) Int. Cl.⁷ .............................. B41J 2/21; B41J 29/393
(52) U.S. Cl. ............................................ 347/43; 347/19
(58) Field of Search .............................. 347/43, 19, 14, 347/12

(56) References Cited

U.S. PATENT DOCUMENTS

| | | | |
|---|---|---|---|
| 4,963,882 A | 10/1990 | Hickman | 347/43 |
| 5,581,284 A | 12/1996 | Hermanson | 347/43 |
| 5,640,183 A * | 6/1997 | Hackleman | 347/40 |
| 6,523,936 B2 * | 2/2003 | Zapata et al. | 347/41 |

* cited by examiner

Primary Examiner—Thinh Nguyen
(74) Attorney, Agent, or Firm—Oliff & Berridge, PLC

(57) ABSTRACT

Selective replacement methods and systems based on a stochastic process use a redundancy inherent, for example, in a four-plus color printing system that has full-width colors. Since the absorption spectra of the four or more colors usually overlap to some extent, there is a redundancy that can be used to reduce artifacts, such as streaks. Since the human visual system is much less sensitive to chrominance changes, than to luminance changes, matching the luminance of a pixel where a color is missing, to the luminance of the original color or to the luminance of the pixels that neighbor that pixel can adequately to reduce the severity of the artifact caused by the missing color while reducing the chance that the replacing process itself introduces any additional artifacts.

17 Claims, 16 Drawing Sheets

(6 of 16 Drawing Sheet(s) Filed in Color)

FIG. 2
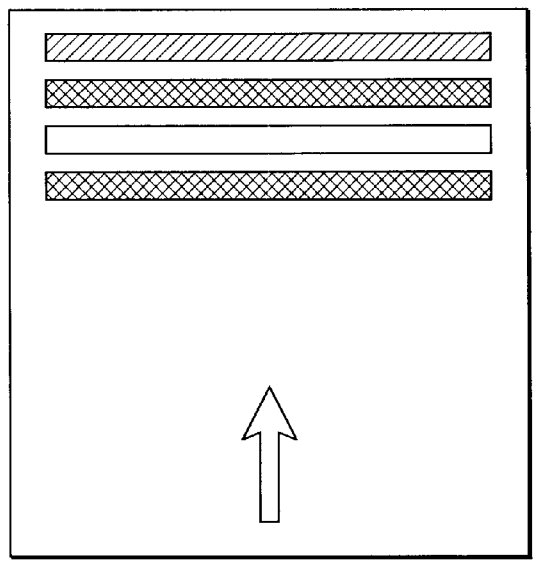
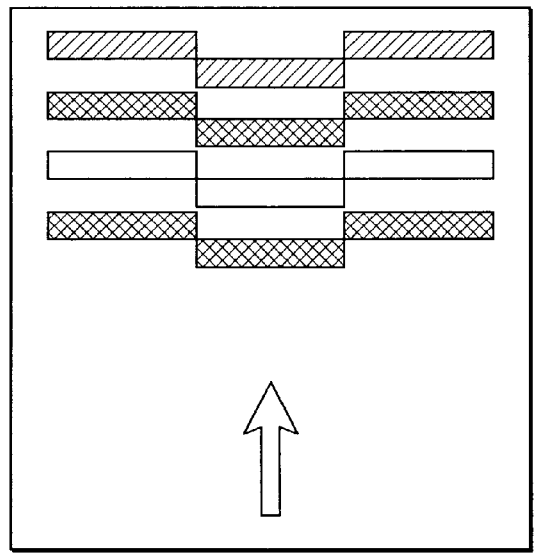
FIG. 3

FIG. 10

| C | C | K | C | C | C |
|---|---|---|---|---|---|
| C | C | K | C | C | C |
| C | C | K | C(K) | C | C |
| C | C | K/Y | C | C | C |
| C | C(K) |  | C | C(K) | C |
| C | C | K | C | C | C |
| C(K) | C | K | C(K) | C | C |
| C | C | K/Y | C | C | C |
| C | C |  | C | C | C |
| C | C(K) | K | C | C | C |

SELECTIVE REPLACEMENT FOR ARTIFACT REDUCTION

BACKGROUND OF THE INVENTION

1. Field of Invention

This invention relates to operating fluid ejection heads.

2. Description of Related Art

Printers generally print images on a recording medium such as paper. A popular type of printer, the ink jet printer, expels ink droplets from a printhead, and propels the ejected ink droplets toward the recording medium or an intermediate surface, such as a coated receiver drum. One method of enhancing productivity in the ink jet printer is to use printheads that span the full width of the print process. One embodiment of such a printhead is the full width array printbar, in which all drop ejectors of a given color, or of all four primary colors (CMYK), are arrayed on a single marking bar or element. An alternate embodiment is the staggered full width array, which is comprised of partial width sections of drop ejectors, stitched together in a staggered array to span the width of the print process. Both embodiments have a large number of ejectors that are spaced apart and orientated towards the recording medium. Ink droplets are ejected from the ejectors of the array as the recording medium or intermediate surface moves past the array. The ink droplets make contact with the recording medium to form dots that create images on the recording medium or intermediate receiving surface.

SUMMARY OF THE INVENTION

Full width array printbars, such as that shown in FIG. 4, are used to provide enhanced productivity by reducing the number of passes of the receiving medium under the printing array. The highest productivity is obtained with single pass printing. As shown in FIG. 4, the full width printing array is fixed, and the recording medium moves past the array. A set of ejectors ejects ink droplets at particular positions across the recording medium. The set of ejectors may produce ink droplets of colors, for example, using CMYK color values, where C represents cyan, M represents magenta, Y represents yellow and K represents black. FIG. 4 shows individual print bars for each color. A common embodiment (not shown) is to include all colors (CMYK) on a single bar, thus avoiding color-to-color registration issues. For a full width array printbar having 600 ejectors per inch per color, a minimum of 5,100 total ejectors are required for each color for a recording medium that is 8.5 inches wide.

For various reasons, the ejectors in a full width array are subject to failure. The failures may be classified in 3 major categories. A given drop ejector may fail such that no ink is ejected, resulting in a missing jet. Off-axis jetting, in which drop position on the receiving medium is affected, is a second major failure mode. Finally, ejectors may fail to eject an adequate amount of ink, resulting in weak jetting. Due to the printing architecture used with full width arrays, particularly with single pass systems, the failures above result in streak artifacts in the direction of the print process (perpendicular to the printing array). This occurs because the position of the failed ejectors relative to one dimension of the recording medium does not change. That is, the fixed, full width array printbar extends across the recording medium and the recording medium moves past the full width array printbars in a direction perpendicular to the linear array of ejectors, but does not move parallel to the full width array printbars. Failed drop ejectors can often be recovered by a printhead maintenance action, which comprises cleaning the front face of the full width array and purging to remove air bubbles trapped in the ejectors. When the failure cannot be recovered by such a print head maintenance action, it is termed a chronic failure, which can only be remedied by replacing the entire array or array section. Because human visual system is very sensitive to structured objects such as lines, for high quality printing, a full width array print bar with one or more failed drop ejectors must be replaced, which results in expensive repair cost as well as printer down time.

The invention provides systems and methods that can reduce artifacts caused by failed or malfunctioning ejectors without introducing other artifacts.

This invention separately provides systems and methods that do not require replacement of a full width array print bar with one or more failed or malfunctioning ejectors.

Selective replacement methods and systems according to this invention, use a redundancy inherent in the full width array printing system to compensate for one or more non-firing or malfunctioning nozzles in one or more colors. As an example, absorption spectra of the four colors cyan C, magenta M, yellow Y and black K usually overlap to some extent, thus there is redundancy that can be used to hide the artifacts, such as streaks. Since the human visual system is much less sensitive to chrominance changes than to luminance changes, matching the luminescence of a pixel where a color is missing, using a random or pseudo-random process, can adequately remove such a streak without introducing other objectionable artifacts.

In various exemplary embodiments, methods and systems for selectively printing a pixel at a print location having a missing color include determining if the missing color is to be printed for that pixel, determining for a pixel that is to include the missing color, which colors are to be printed based on a color value to be printed for that pixel, and selecting, when the missing color is to be printed, at least one color to be printed in place of the missing color based on at least a pseudo-random process. In various exemplary embodiments, the pseudo-random process is a stochastic process.

In various exemplary embodiments, methods and systems include determining a color value of at least one neighboring pixel, wherein selecting at least one color to be printed in place of the missing color includes selecting the at least one color based on the at least one determined color value of the at least one neighboring pixel. In various exemplary embodiments, methods and systems include replacing a color value of at least one neighboring pixel with another color value that corresponds with the at least one color to be printed in place of the missing color.

In various exemplary embodiments, methods and systems include determining a type of image to be printed, wherein selecting the at least one color to be printed in place of the missing color includes selecting the at least one color based on the determined type of image to be printed.

In various exemplary embodiments, methods and systems include not printing a color in the pixel with the missing color based on the pseudo-random process.

In various exemplary embodiments, methods and systems include determining if a given print location has a missing color. In various exemplary embodiments, methods and systems include determining if at least one ejector is malfunctioning or has failed, and disabling the at least one ejector that is malfunctioning or has failed from ejecting ink droplets.

These and other features and advantages of this invention are described in, or are apparent from, the following detailed description of various exemplary embodiments of the systems and methods according to this invention.

BRIEF DESCRIPTION OF THE DRAWINGS

The patent or application file contains at least one drawing executed in color. Copies of this patent or patent application publication with color drawings will be provided by the Office upon request and payment of the necessary fee.

Various exemplary embodiments of this invention will be described in detail, with references to the following figures, wherein:

FIG. 2 illustrates one exemplary embodiment of a linear full width printbar usable with the systems and methods that selectively print compensating colors according to this invention;

FIG. 3 illustrates one exemplary embodiment of a staggered full width printbar usable with the systems and methods that selectively print compensating colors according to this invention;

FIG. 10 illustrates a pixel image having pixels with missing colors, where selected pixels are replaced with replacement colors and selected neighboring pixels are replaced with replacement colors according to the invention;

DETAILED DESCRIPTION OF PREFERRED EMBODIMENTS

Figure 1:
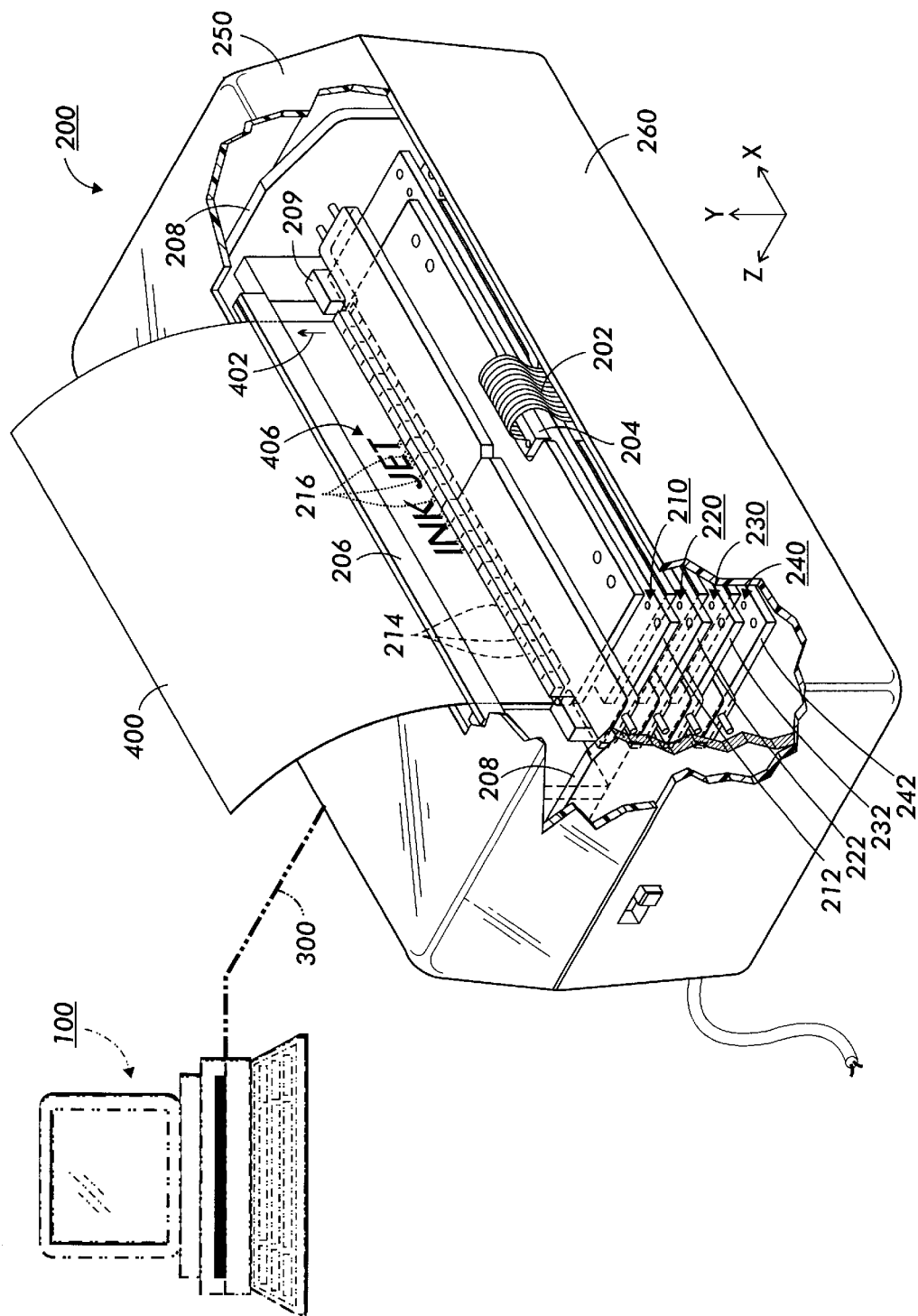
FIG. 1 illustrates a data processing system usable to implement systems and methods that selectively print compensating colors that reduce artifacts according to this invention.
Figure 4:
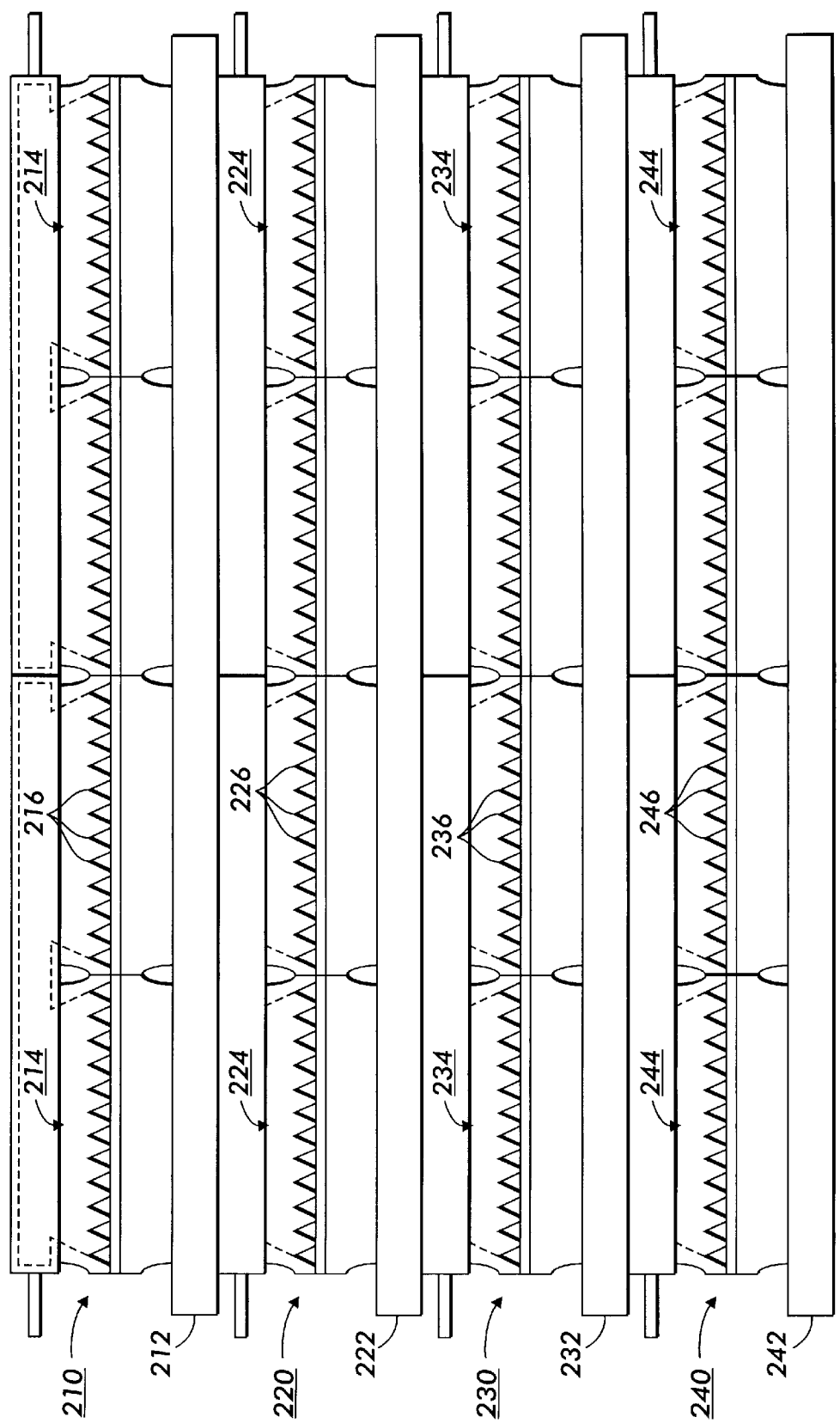
FIG. 4 illustrates one exemplary embodiment of an enlarged, schematic front view of four, full width array printbars usable with the systems and methods that selectively print compensating colors according to this invention.

FIG. 1 shows a computer 100 coupled to a multicolor ink jet printer 200 via a link 300. As shown in FIG. 4, the multicolor ink jet printer 200 includes four full width array printbars 210, 220, 230 and 240 usable to eject, for example, black, magenta, cyan and yellow inks, respectively, enclosed within the upper and lower covers 250 and 260 of the multicolor ink jet printer 200. Each printbar 210, 220, 230 and 240 comprises a supporting substrate 212, 222, 232 and 242, respectively that supports an array of printhead subunits 214, 224, 234 and 244, respectively. The array of printhead subunits 214, 224, 234 and 244 may be disposed on the supporting substrate linearly, as shown in FIG. 2, or the individual subunits 214, 224, 234 and 244 may be staggered from one subunit to another subunit, as shown in FIG. 3.

The printhead subunits 214, 224, 234 and 244 contain ejectors 216, 226, 236 and 246, respectively, that eject ink droplets onto the recording medium 400. A printed wiring board (not shown) can be attached to the substrates 212, 222, 232 and 242 behind the array of printhead subunits 214, 224, 234 and 244. The printed wiring board contains the circuitry required to interface and drive the individual actuating elements (not shown) in the printhead subunits 214, 224, 234 and 244 to eject ink droplets from the ejectors 216, 226, 236 and 246, respectively. Data required to drive the individual actuating elements of the printhead subunits 214, 224, 234 and 244 may be supplied from an external system, such as the computer 100, using a standard printer interface or by a printer microprocessor (not shown) within the printer 200, and transferred to the printbars 210, 220, 230 and 240 by ribbon cables 202, only one of which is shown, and pin-type connectors 204.

The recording medium 400 is fed in a process direction, as indicated by an arrow 402, as ink droplets are selectively ejected from various ones of the ejectors 216, 226, 236 and 246 in the printhead subunits 214, 224, 234 and 244, respectively to produce images 406 on the recording medium 400. The recording medium 400 is fed by a conventional recording medium feeding mechanism (not shown) and is maintained in close proximity to the printhead subunits 214, 224, 234 and 244. The multicolor ink jet printer 200 paper guides 206 guide the recording medium 400 past the printhead subunits 214, 224, 234 and 244. The spacing between the front faces of the subunits 214, 224, 234 and 244, which are all coplanar with one another, and the surface of the recording medium 400, which is commonly referred to as the Z-direction, determines the position of the ink droplets ejected from individual ones of the ejectors 216, 226, 236 and 246. Furthermore, it is desirable that the spacing between the parallel and adjacent full width array printbars 210, 220, 230, and 240 be maintained as small as possible and within very close tolerances.

The multicolor ink jet printer 200 also includes a pair of rigid frame members 208 which provide mechanisms, such as reference points (not shown) for receiving alignment pads 209 and for alignedly attaching the supporting substrates 212, 222, 232 and 242, of the full width array printbars 210, 220, 230, and 240, respectively. The frame members 208 additionally provide support for, and attachment points of, the full width array printbars 210, 220, 230 and 240.

FIG. 4 shows an enlarged, schematic front view of the four, full width array printbars 210, 220, 230 and 240. Each full width array printbar 210, 220, 230 and 240 is depicted as having only four printhead subunits 214, 224, 234 and 244, respectively, for clarity of explanation, although each printbar may have many more subunits than that illustrated in FIG. 4. One printbar is usually an actual printer required for each of the differently colored ink ejectable at one time by the multicolor ink jet printer. For example, if the multicolor ink jet printer 200 is a 4-color device and if CMYK colors are used, a set of four printbars are used to represent the colors cyan (C), magenta (M), yellow (Y), and black (K). Precisely aligning the printbars is desirable because both black-on-black and multicolor printing can involve several different printbars sequentially propelling ink droplets on the same target points or pixel locations on the recording medium 400. In addition, ejectors of all colors (typically CMYK) can be fabricated together on one bar in a so-called monolithic full width array (not shown). This avoids the alignment issues discussed above.

Ink is supplied to the individual ejectors 216, 226, 236 and 246 through ink channels (not shown) which connect the ejectors 216, 226, 236 and 246 to corresponding subunit reservoirs (not shown). The subunit reservoirs have inlets which are aligned and sealed with outlets in ink manifolds (not shown). The location of full width array printbars 210, 220, 230 and 240, respectively, positions the ejectors 216, 226, 236 and 246 of the printhead subunits 214, 224, 234 and 244 which in turn determines the accurate placement of the ink droplets from each printbar 210, 220, 230 and 240 relative to one another in order to place one ink droplet on a previously ejected droplet on the recording medium 400 to obtain the desired final colored image.

Figure 5:
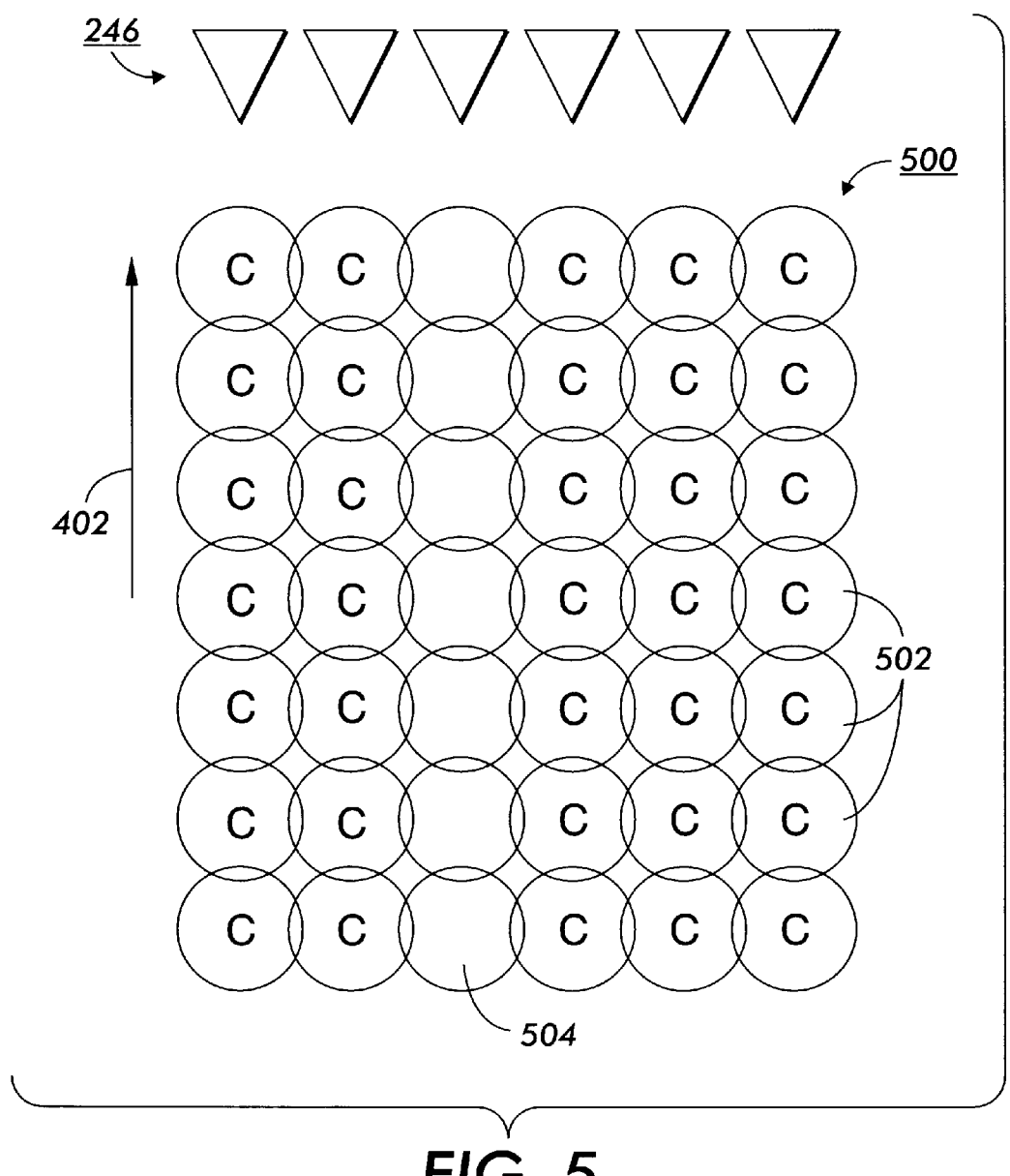
FIG. 5 illustrates an example of a pixel image having streak artifacts.
Figure 6:
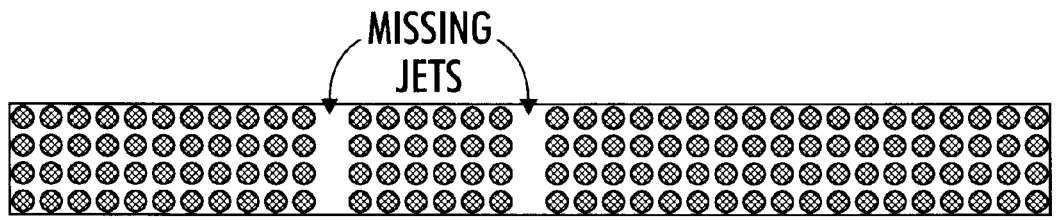
FIG. 6 illustrates an example of a pixel image having streak artifacts caused by missing color pixels.
Figure 7:
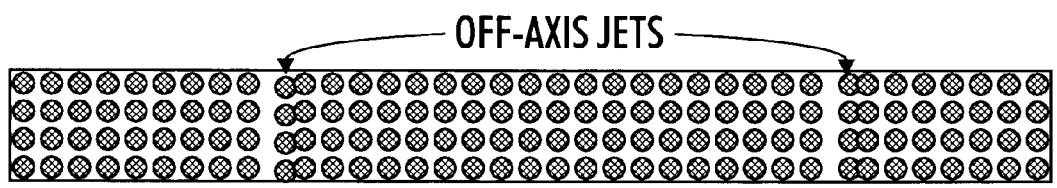
FIG. 7 illustrates an example of a pixel image having streak artifacts caused by off-axis or mis-directed pixels.
Figure 8:
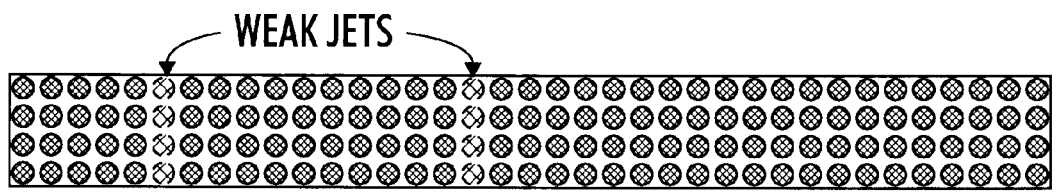
FIG. 8 illustrates an example of pixel image having streak artifacts caused by weak color pixels.

FIG. 5 shows a cyan pixel image 500 printed by a printbar that ejects cyan colored ink onto the recording medium 400 as the recording medium 400 moves in the direction of the arrow 402. The cyan-colored pixels 502, which are indicated by the letters "C", each receive a cyan ink droplet from one of the ejectors 246 of the cyan printbar 240. A vertical column of pixels 504 is left unprinted, indicating that cyan ink drops were not ejected onto those pixel locations, because the ejector 246 of the cyan printbar 240 for that column of pixels has malfunctioned, such that it cannot eject any cyan ink whatsoever. This type of failure is illustrated in FIG. 6. FIG. 7 shows a cyan drop ejector that has failed such that the direction of the ejected droplet is affected, commonly referred to as off-axis or mis-directed jetting. As illustrated, this produces a different type of streak defect from a missing jet as illustrated in FIG. 6. There is now overlap of pixels on one side of the failed ejector, causing a darker streak, and missing ink density on the other side of the failed ejector, causing a light streak. FIG. 8 shows the failure known as weak jetting, in which the failed ejector produces drops which are smaller in volume than normal. This produces a streak that is lighter than normal in the process direction.

The selective replacement systems and methods according to this invention use redundancy in the full width array printing system to compensate for one or more chronically malfunctioning ejectors associated with a given pixel location along the printbars. In various exemplary embodiments, upon detection, such chronically failed ejectors are disabled, making all failures shown in FIG. 5 resemble the missing jet failure depicted in FIG. 6. This is done to reduce the spatial and time variability of failed ejectors that are still capable of ejecting some ink. Since the absorption spectra of the four colors usually overlap to some extent, there is a redundancy that can be used to reduce artifacts, such as light streaks that occur due to such non-firing ejectors. However, the remaining color values usually cannot completely compensate for the failed ejector. Thus, merely substituting one other color ink for the missing color ink, while reducing the streak artifact, may create a different colored line. For example, if cyan (C) is the missing color, then no combination of the remaining three colors magenta (M), yellow (Y) and black (K) can form an exact replacement of the missing color. Thus, by selecting a single replacement color using one or more of the remaining three colors may form a streak of that replacement color in the cyan image.

Figure 9:
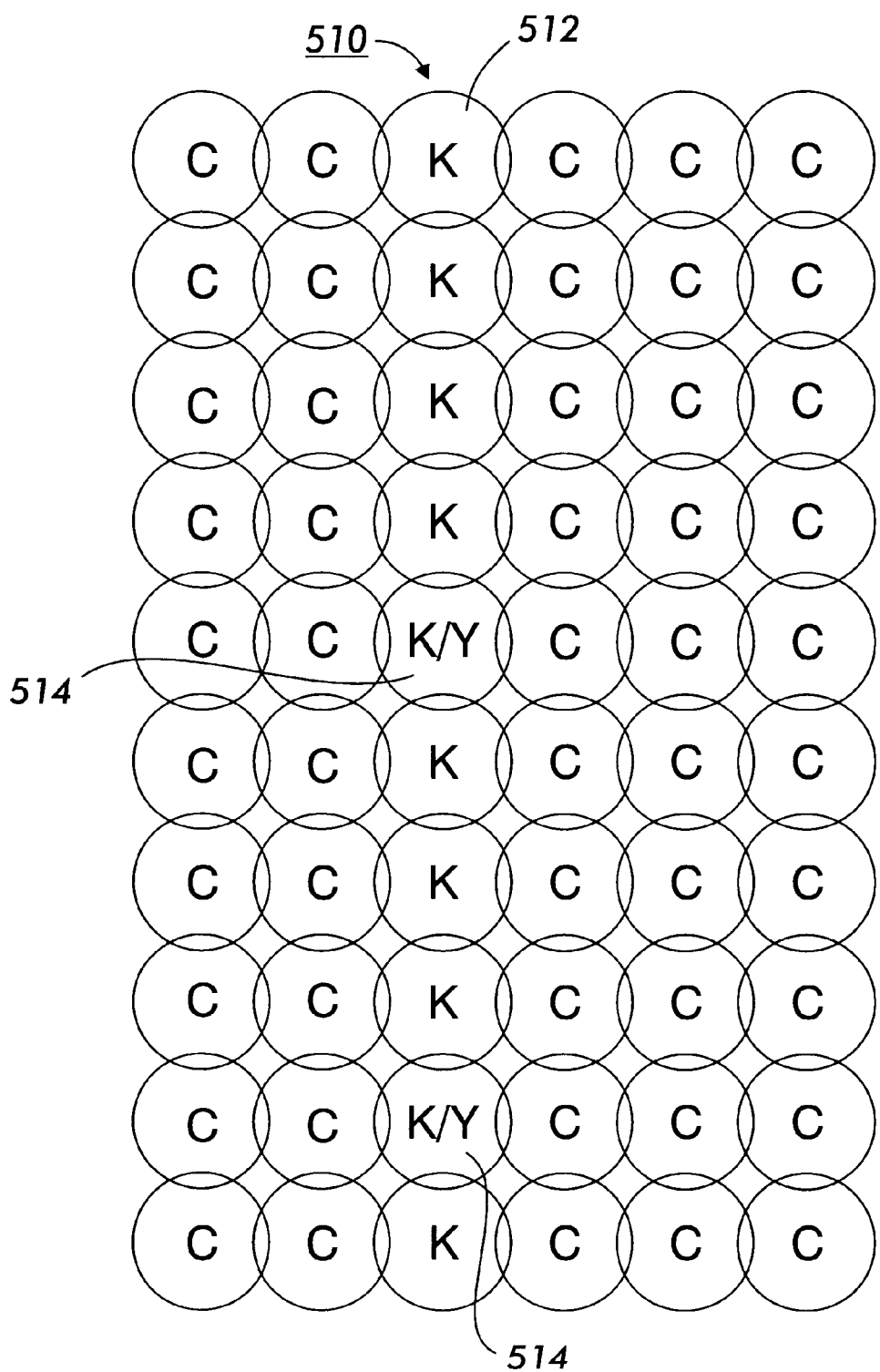
FIG. 9 illustrates a pixel image having pixels with missing colors, where the missing color for that pixel is replaced in the image with replacement colors according to the invention.

FIG. 9 shows one exemplary embodiment of applying the selective replacement systems and methods according to the invention that introduces randomness or pseudo-randomness to the print process based on an outcome of a stochastic process. Introducing randomness in the print process when replacing a missing color with one or more other colors effectively reduces visually perceptible streaks that may be caused by consistently replacing the missing color with a simple replacement color. This is because the human visual system is much less sensitive to chrominance changes than to luminance changes. For example, as shown in FIG. 9, in a cyan image 510, if 80% of the missing cyan ink droplets are replaced with a black (K) ink droplets 512 and the remaining 20% of the missing cyan ink droplets are replaced with a combination of black (K) ink droplets and yellow (Y) ink droplets 514, the artifact caused by the line of missing cyan ink droplets is greatly reduced and is not readily perceived by the human visual system. It should be appreciated that it is not necessary to have 100% black (K) at the missing position. For example, if a calibration procedure determines that 80% black (K) gives minimum luminance difference from 100% cyan (C), then only 80% of the missing pixels will have black (K) and the other 20% can be left unfilled.

It should be further appreciated that, while approximately 4 of 5 missing pixels receive only black (K) ink droplets and approximately 1 of 5 missing pixels receive both black (K) and yellow (Y) ink droplets, those black and yellow receiving pixels do not occur at every fifth pixel. Rather, the black and yellow receiving pixels are randomly distributed among all missing cyan pixels at a rate that approaches 20% of the total missing cyan pixels. For instance, for any small sample of the missing cyan pixels, the actual percentage of black and yellow receiving pixels may be significantly different than 20%, and could even approach 100%. Thus, the 20% value is statistical only and the actual number of black and yellow receiving pixels more closely approaches the 20% value as the number of missing cyan pixels increases.

FIG. 10 shows another exemplary embodiment of applying the selective systems and methods according to the invention that effectively reduces visually perceptible streaks. As shown in FIG. 10, reducing visually perceptible streaks may include replacing the missing color with replacement color using randomness or pseudo-randomness based on an outcome of a stochastic process, as described with respect to FIG. 9. In accordance with the embodiment, neighboring pixels 614 are also selected using random or pseudo-random process or based on an outcome of a stochastic process. For example, in a cyan image, even though the correct color for the neighboring pixels of the missing color pixels is cyan (C), for the selected neighboring pixels 614 a combination of cyan (C) and black (K) replaces the cyan (C). It should be appreciated the neighboring pixels selected need not be immediate to the missing pixels, but can be in the approximate vicinity of the missing pixels. It should further be appreciated that in FIG. 10, not all pixels with missing colors have been replaced with replacement colors. Instead, some of the pixels have been intentionally left with the missing colors.

Figure 11:
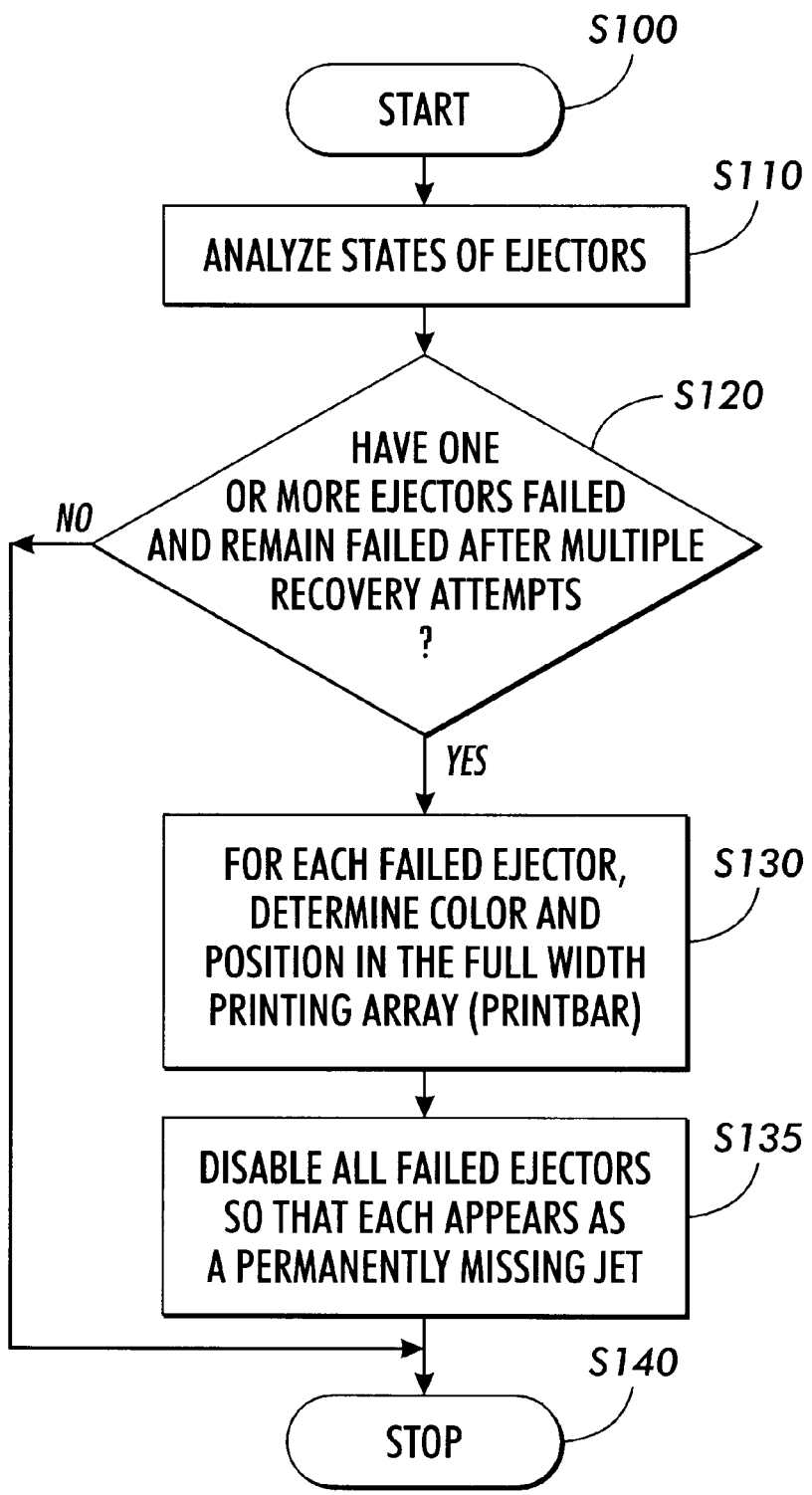
FIG. 11 is a flowchart outlining one exemplary embodiment of identifying and disabling one or more chronically failed ejectors according to this invention.

FIG. 11 is a flowchart outlining one exemplary embodiment for identifying and disabling one or more chronically failed ejectors. As shown in FIG. 11, operation of the method starts in step S100, and continues to step S110, where a diagnostic routine or application is used to analyze the states of the ejectors. Then, in step S120, a determination is made, based on the analysis, whether one or more ejectors have failed, and remain in a malfunctioning state after multiple recovery attempts. As mentioned previously, a recovery action may involve cleaning the front face of the page wide printing array and purging trapped air from the drop ejectors. If no ejectors have failed chronically, operation jumps to step S140 where the operation terminates. Otherwise, operation continues to step S130, where, for each failed ejector, the color and position of the ejector in the full width array print head is determined. The operation then continues to step S135, in which all failed ejectors are disabled, rendering them missing jet failures. The operation then continues to step S140 where the operation terminates.

Figure 12:
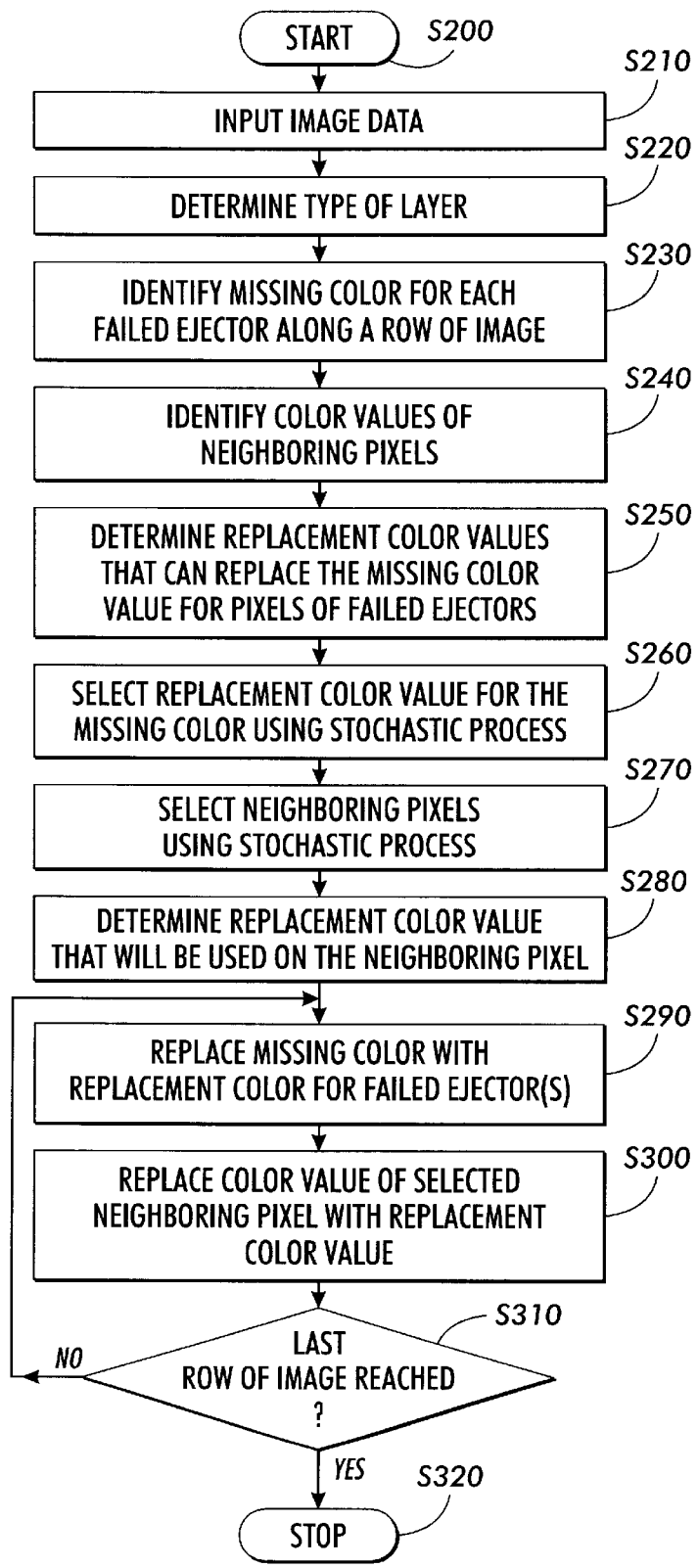
FIG. 12 is a flowchart outlining one exemplary embodiment of a method for selectively replacing missing pixel colors according to this invention.

FIG. 12 is a flowchart outlining one exemplary embodiment of a method for selectively replacing missing pixel colors according to this invention. As shown in FIG. 12, operation of the method begins in step S200, and continues to step S210, where image data for an image to be printed is input. Then, in step S220, a determination is made on the type of image to be printed such as text, graphics or pictorial image. Next, in step S230, for each failed ejector, the missing color values to be printed by that ejector along the row of the image are identified. Then, in step S240, color values of neighboring pixels are identified for the pixels with missing color values. Operation then continues to step S250.

In step S250, one or more replacement color values are determined that can replace the missing color value for pixels of the failed ejector or ejectors. In determining the one or more replacement color values, the original missing color value and/or the color value of the one or more neighboring pixels and/or the desired optical density based on the type of image for that specific pixel to be printed may be taken into consideration. Next, in step S260, a replacement color value is selected from one or more replacement color values using a stochastic process. Operation then continues to step S270.

In step S270, one or more neighboring pixels are selected using a stochastic process. Then, in step S280, a determination is made on the replacement color value or values that will be used on the selected neighboring pixels. Operation then continues to step S290.

In step S290, for each ejector, and for each pixel location, the one or more non-failed ejectors that can produce ink droplets of the remaining non-failed colors at the location of the failed ejector to replace the missing ink droplet with the replacement color value determined in step S260. Coinciding with step S290, in step S300, for the selected neighboring pixel or pixels, the one or more non-failed ejectors produce ink droplets the provide for the color value or values determined in step S280. Operation then continues to step S310, where a determination is made whether the last row of the image has been reached. If not, the operation jumps to step S290 to repeat the process. Otherwise, operation of the method continues to step S320, where the operation terminates.

In various embodiments, the stochastic process provides, for any particular point, the possibility of a replacement color using a random or pseudorandom process. Further, a luminance match to the missing color within a region may be used to determine the probability of each color to be printed within the region. In various embodiments, a carefully calibrated deterministic approach can be used as well.

In various exemplary embodiments, the color or combination of colors used to compensate for any given missing color or for any given combination of missing colors, possibly based on one or more neighboring pixel can be predetermined or stored in a look-up table in a memory (such as the memory 630 of FIG. 13), and selected based on the stochastic process. In various exemplary embodiments, compensating each color includes optimization that depends on the characteristics of different printers through calibration.

Figure 13:
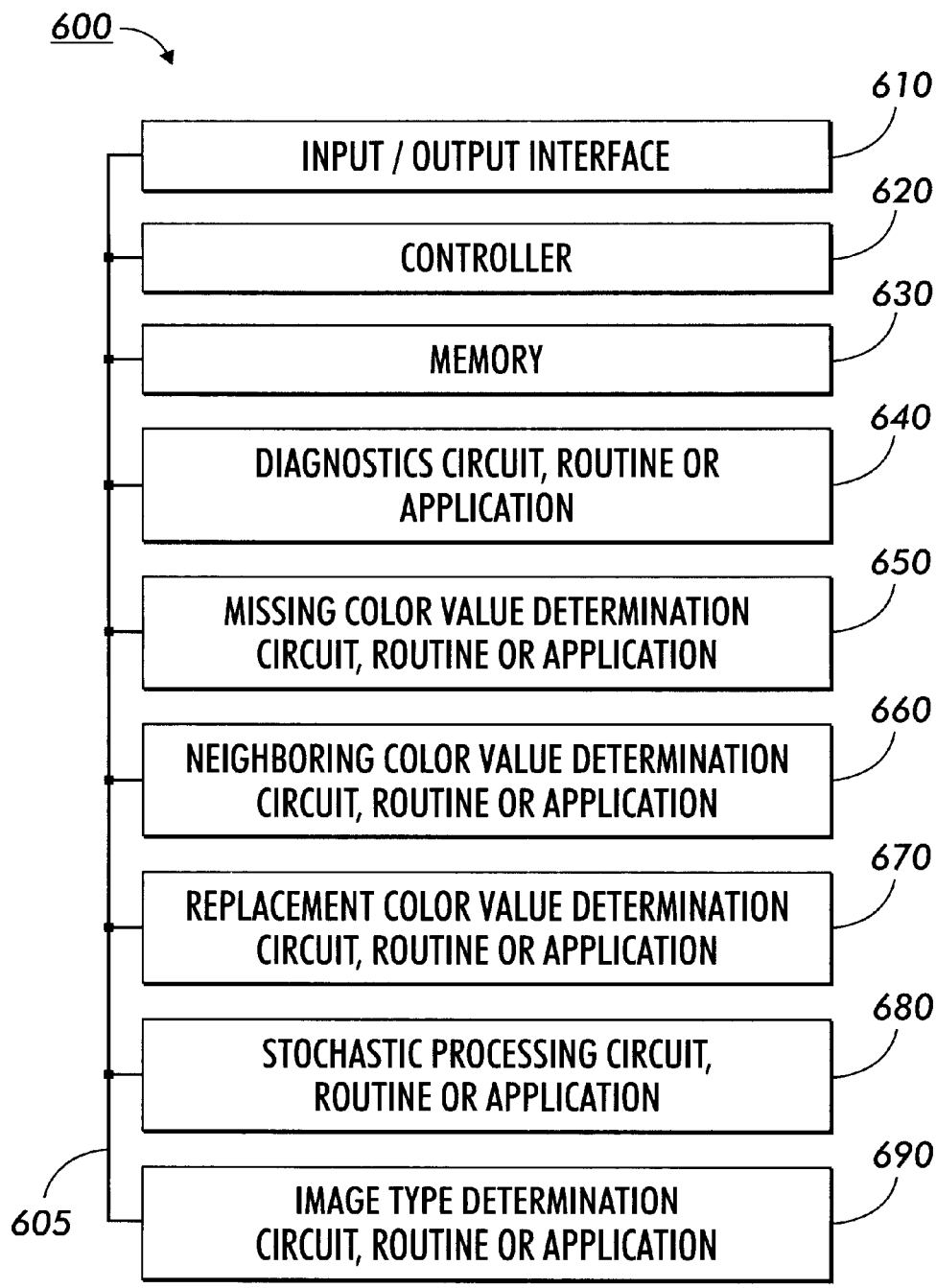
FIG. 13 is a block diagram of one exemplary embodiment of a selective replacement system according to this invention.

FIG. 13 is a block diagram of an exemplary embodiment of a selective replacement system 600 that reduces the streak artifact in a printed image according to this invention. The selective replacement system 600 may be implemented on an external system, such as the computer 100, or the selective replacement system 600 may be implemented in the printer 200. As shown in FIG. 13, in this exemplary embodiment, the selective replacement system 600 includes an input/output interface 610, a controller 620, a memory 630, a diagnostic circuit, routine or application 640, a missing color value determination circuit, routine or application 650, a neighboring color value determination circuit, routine or application 660, an image type determination circuit, routine or application 670, a replacement color value(s) determination circuit, routine or application 680, and a stochastic processing circuit, routine or application 690 each interconnected by one or more control and/or data busses and/or application programming interfaces 605.

The diagnostic circuit, routine or application 640 detects a failure of one or more of the ejectors 216, 226, 236, and/or 246. Specifically, the diagnostic circuit, routine or application 640 determines for each failed ejector, which type of failure is present, and the color and the position of that ejector in the full width printing array. In one embodiment, a clogged, malfunctioned, or failed ejector 216, 226, 236, and/or 246 may be automatically identified by electronic detection of electrically failed actuator elements or by the electronic detection of air inside the individual printhead subunit s 214, 224, 234 and/or 244, as disclosed in U.S. Pat. No. 5,072,235, which is incorporated herein by reference in its entirety. In another exemplary embodiment, each clogged, malfunctioned, or failed ejector 216, 226, 236 and/or 246 may be detected using diagnostics. For example, a diagnosis step may be used to detect clogged, malfunctioned, or failed ejectors 216, 226, 236 and/or 246 and to determine which type of failure is present. The diagnosis method may be implemented by printing special patches or ejection patterns and then analyzing the patches or patterns. The diagnosis method may be performed either periodically or as requested by the user on a need basis. Regardless of how the information identifying the non-ejecting ejectors is obtained, this information is then forwarded to the controller 620, that in turn causes the system 600 to disable the ejectors from ejecting ink droplets. The information identifying the non-ejecting ejectors is also forwarded to the missing color value determination circuit, routine or application 650, and is optionally stored in the memory 630.

The missing color value determination circuit, routine or application 650 determines the missing color value based on the color of the ink droplet that the failed ejector is to eject. For example, if the cyan ink droplet ejector failed, then the missing color value determination circuit, routine or application 650 determines that the missing color value is cyan. For a given image to be printed, for a given location along the process direction, and for a given non-ejecting ejector, which defines a given pixel, that should include the missing color, the neighboring color value determination circuit, routine or application 660 determines the color values of one or more of the neighboring pixels that are adjacent to or in the approximate vicinity of the pixel with the missing color value. The image type determination circuit, routine or application 670 determines the type of image, such as text, graphics or pictorial that is to be printed at the location of that pixel.

For each pixel having a missing color, the replacement color value(s) determination circuit, routine or application 680 determines one or more replacement color values that can replace the color value of failed ejector for that pixel. Further, for each selected neighboring pixels (the selection may be performed by the stochastic processing circuit, routine or application 690), the replacement color value(s) determination circuit, routine or application 680 also determines one or more replacement color values that can replace the original neighboring pixel color value.

In determining replacement colors, the replacement color value(s) determination circuit, routine or application 680 may take into consideration various information such as the missing colors of pixels, colors of the neighboring pixels and/or image types.

For each pixel having a missing color, the replacement color value(s) determination circuit, routine or application 680 provides one or more replacement color values that can replace the color value of failed ejector to the stochastic processing circuit, routine or application 690. For each pixel having a missing color, the stochastic processing circuit, routine or application 690 determines, based on a stochastic process, the replacement color value for that is to replace the missing color value for that pixel. The determination result of the stochastic processing circuit, routine or application 690 is then used to replace for that pixel the color value of the missing color in the received image data. Further, the neighboring color value determination circuit, routine or application 660 provides the color values of one or more of the neighboring pixels to the stochastic processing circuit, routine or application 690. The stochastic processing circuit, routine or application 690 may then select which neighboring pixels will have their original color value replaced. The determination result of the stochastic processing circuit, routine or application 690 is then used to replace the color value for that neighboring pixel in the received image data. The image data is then used to drive the ejectors 216, 226, 236 and 246 of the multicolor ink jet printer 200.

Figure 14:
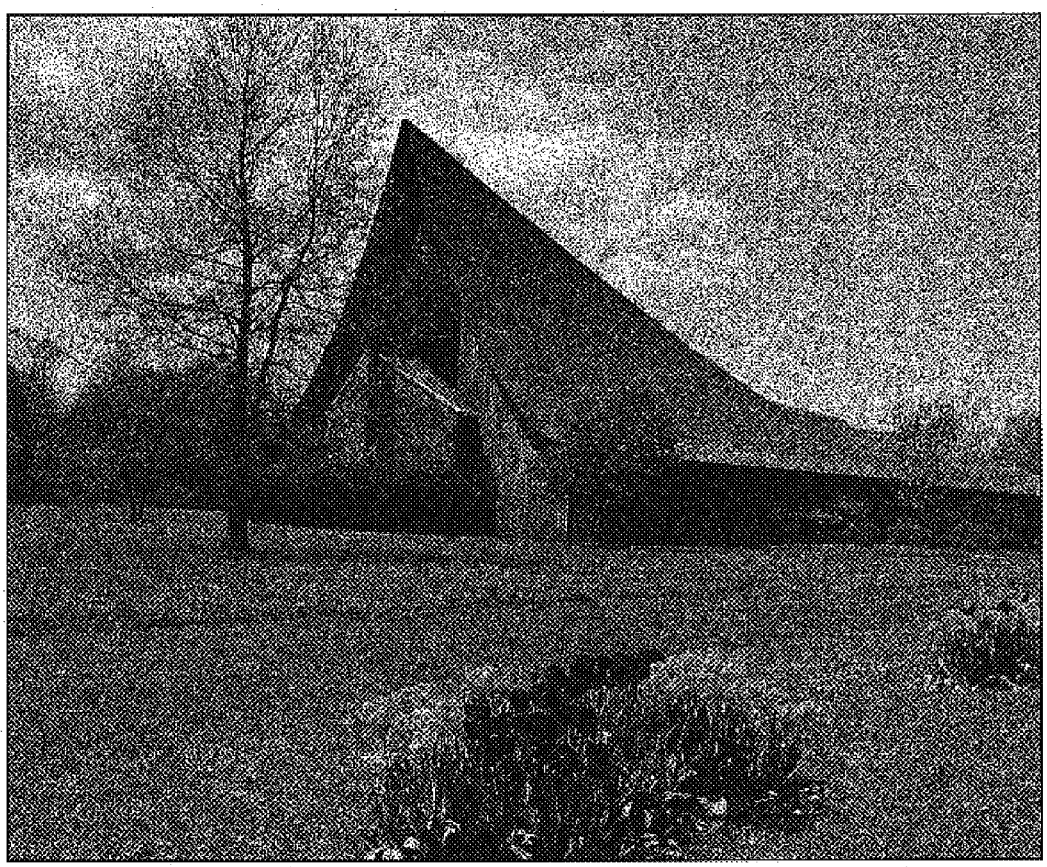
FIG. 14 illustrates an original image showing a church.
Figure 15:
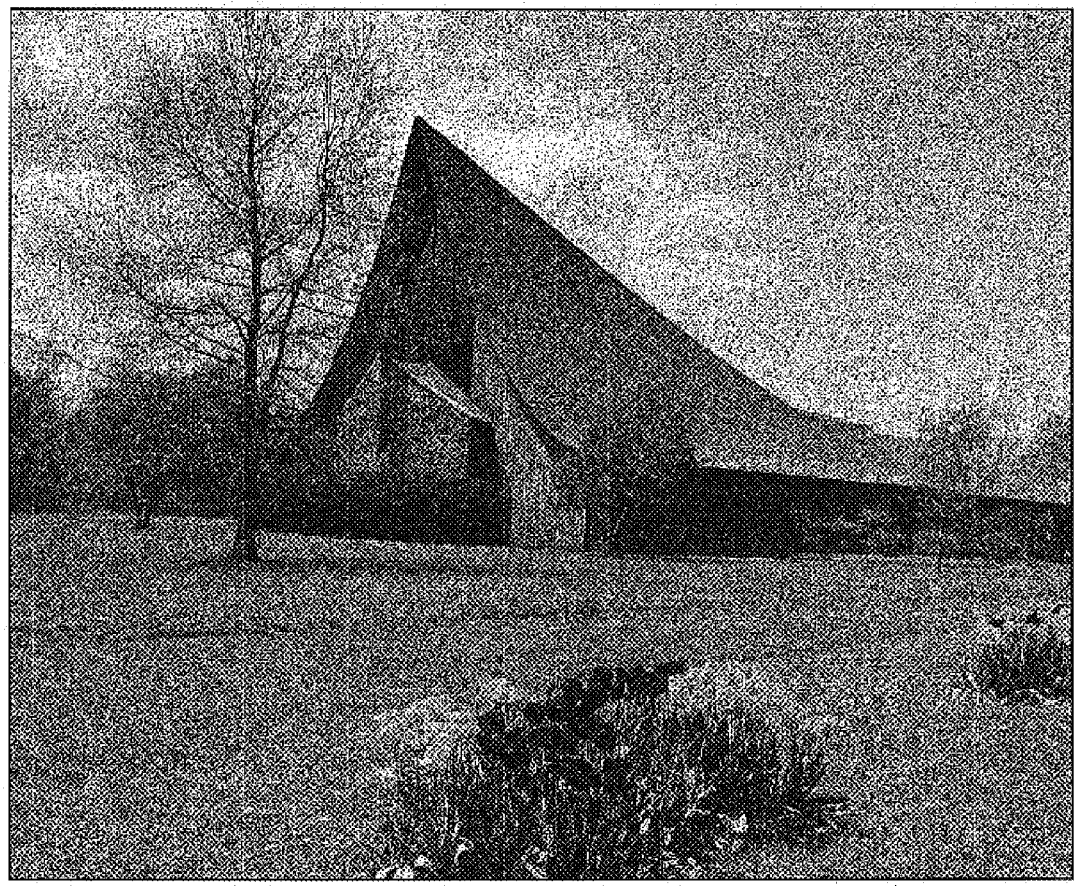
FIG. 15 illustrates the image of FIG. 14 generated with a plurality of black ink ejectors that have failed.
Figure 16:
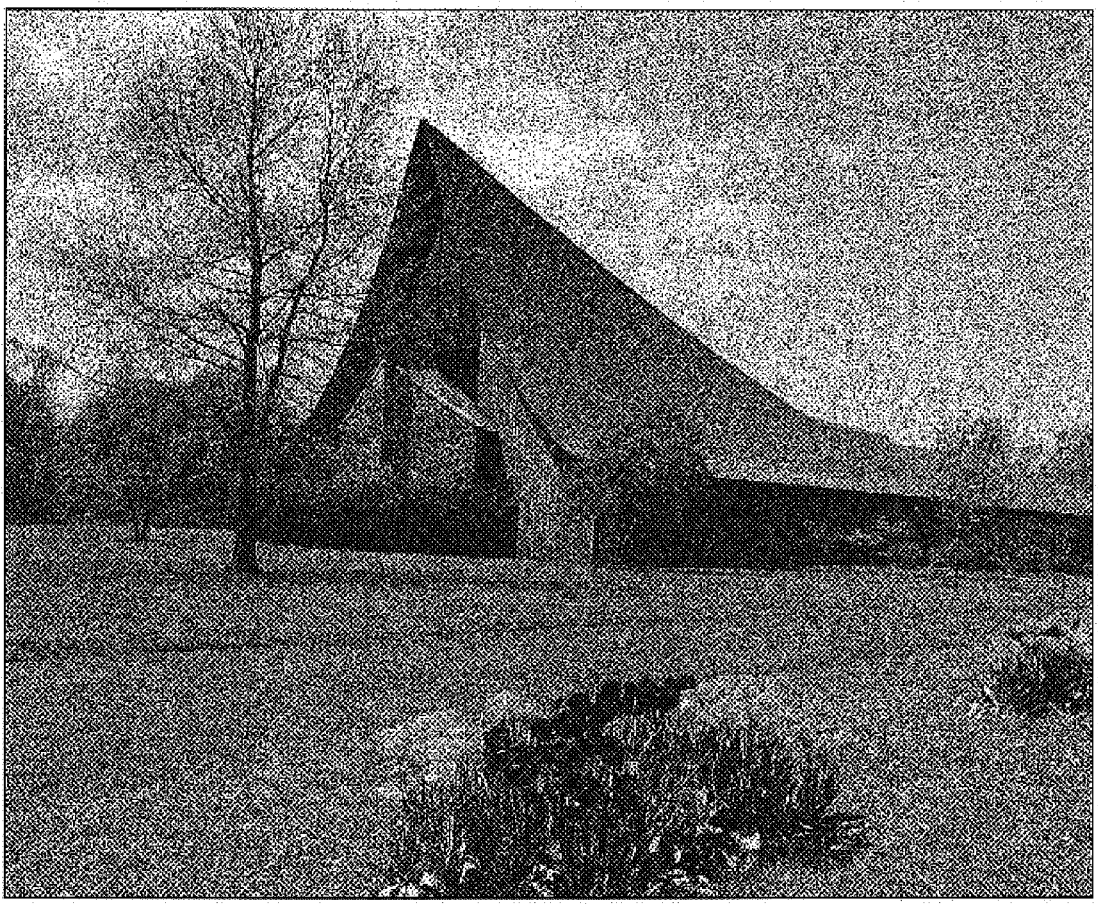
FIG. 16 illustrates the image of FIG. 15 generated with each missing black ink droplet replaced with one cyan, one magenta and one yellow droplet.

FIGS. 14–19 illustrate experimental results of the selective replacement systems and methods according to the invention. FIG. 14 shows an original image of a church printed in CMYK color space, which has been halftoned using scalar error diffusion. The image was printed using a 4-color full-width xerographic printer at 400 dpi. To simulate the failed ejectors, several columns of black pixels were taken off as shown in FIG. 15. Even though a xerographic printer is different from an inkjet printer, the effect from a failed ejector is similar to a missing column of particular color pixels. FIG. 15 shows the church image where several black (K) ink droplet ejectors have failed. As shown in the FIG. 15, vertical white (background color) streaks are visible along the image. In FIG. 16, for each failed black ink ejector, the missing black (K) ink droplets have been conventionally replaced with ink droplets ejected from other working ejectors in the same locale as that failed ejector. Specifically, the working cyan (C) ejector, magenta (M) ejector and yellow (Y) ejector, respectively, eject one cyan (C) ink droplet, one magenta (M) ink droplet and one yellow (Y) ink droplet to replace the missing black (K) ink droplet. Although the vertical white streaks are removed, in dark grey areas, such as the road, vertical black streaks appear in place of the white streaks. That is, one type of artifact has merely been replaced with another type of artifact.

Figure 17:
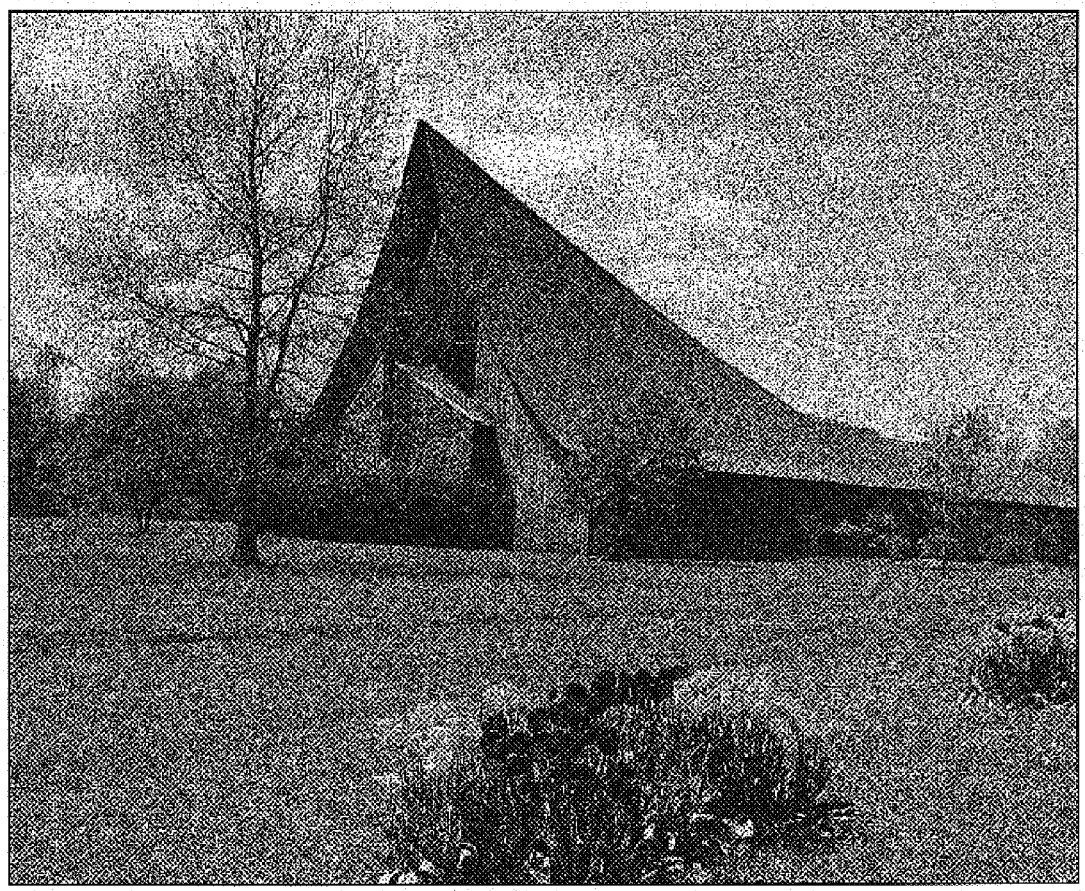
FIG. 17 illustrates the image of FIG. 15 generated by replacing the missing black ink droplets and neighboring black ink droplets with the replacement colors ink droplets selected based on a stochastic process.

In FIG. 17, using a stochastic process that is independent of the surrounding image values for a photographic image, cyan (C) is selected 50% of the time, independently of the other two color values, magenta (M) and yellow (Y). Conversely, magenta (M) is selected 50% of the time, independently of the other two color values, cyan (C) and yellow (Y). Likewise, yellow (Y) is selected 50% of the time independently of the other two color values, cyan (C) and magenta (M). The stochastic process is performed as an alternative to conventionally replacing each missing black (K) ink droplet with one cyan (C) ink droplet, one magenta (M) ink droplet and one yellow (Y) ink droplet. As shown in FIG. 17, the vertical white streaks are removed without introducing other artifacts.

As a result ~12.5% of the missing black pixels will be replaced with cyan, magenta and yellow, ~12.5% will be replaced with only cyan and magenta, ~12.5% will be replaced with only cyan and yellow, ~12.5% will be replaced with only magenta and yellow, ~12.5% will be replaced with only cyan, ~12.5% will be replaced with only magenta, ~12.5% will be replaced with only yellow and ~12.5% will not be replaced at all. Moreover, it should be appreciated that the distribution of the different replacement combinations will be random. That is the 50% of the pixels missing black that receive cyan will be randomly distributed within the image. Likewise the 50% of the pixels missing black that receive magenta, and the 50% of the pixels missing black that receive yellow will each be randomly distributed throughout the image.

Figure 18:
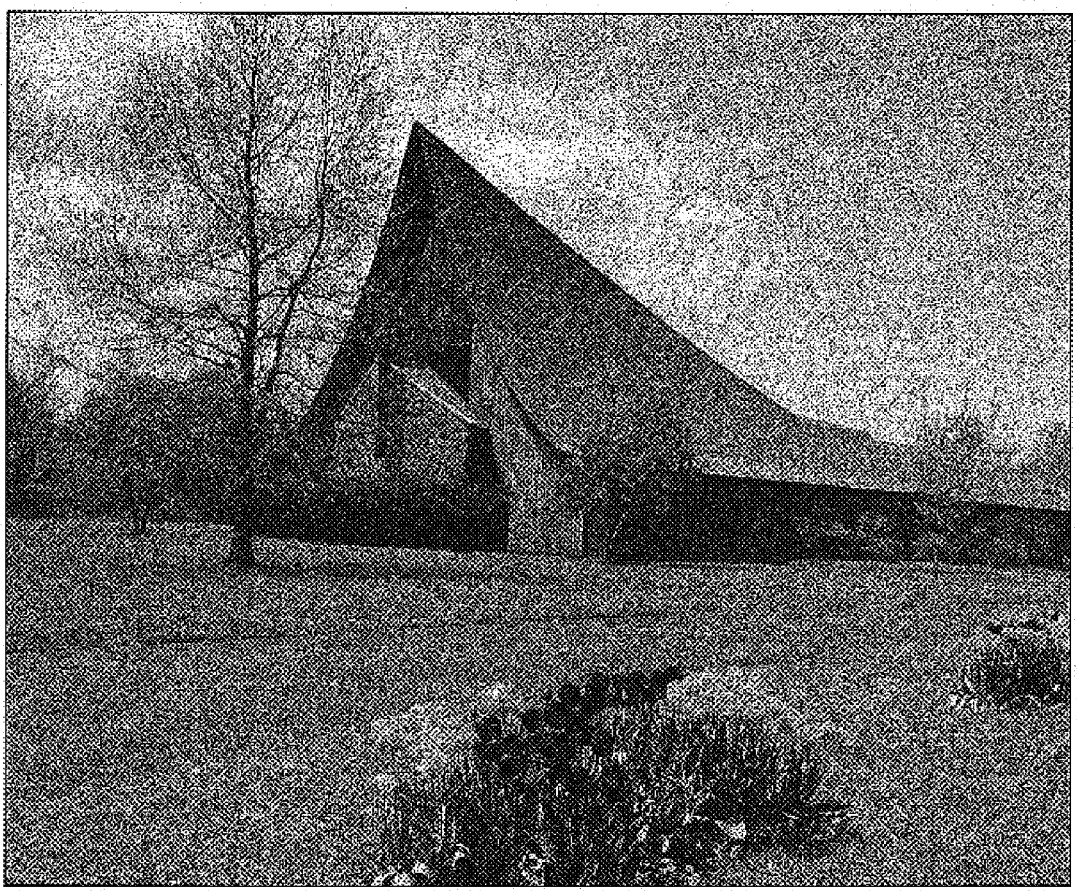
FIG. 18 illustrates the image of FIG. 14 generated with a plurality of cyan ink ejectors that have failed.
Figure 19:
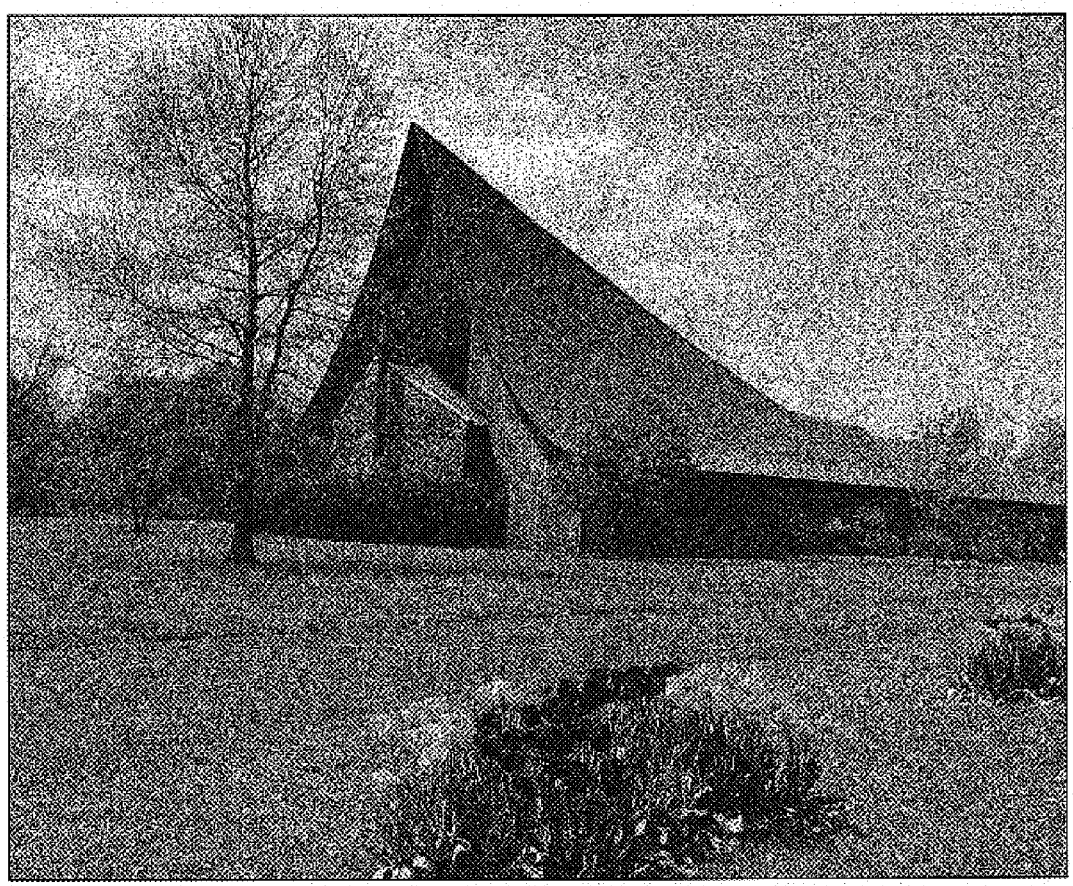
FIG. 19 illustrates the image of FIG. 18 generated with the missing cyan ink droplets with the other colors based on a stochastic process.

FIG. 18 shows the church image where several failed cyan (C) ink droplet ejectors have been simulated. As shown in the FIG. 18, vertical white streaks are visible in the image, particularly in the blue sky portion of the image. In FIG. 19, using the systems and methods according to this invention, including a stochastic process, the randomly determined 80% of missing cyan (C) ink droplets are replaced with only black (K) ink droplets and the remaining 20% of the missing cyan (C) ink droplets are replaced with a combination black (K) ink yellow (Y) ink droplets. As shown in FIG. 19, the vertical white streaks in the blue sky has been greatly reduced without introducing other artifacts.

In the various exemplary embodiments outlined above, the selective replacement system 600 can be implemented using a programmed general purpose computer. However, the selective replacement system 600 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in turn capable of implementing the flowchart shown in FIG. 12 can be used to implement the selective replacement system 600.

Each of the circuits, routines or applications of the selective replacement system 600 can be implemented as portions of a suitably programmed general purpose computer. Alternatively, each of the circuits, routines or applications of the selective replacement system 600 outlined above can be implemented as physically distinct hardware circuits within an ASIC, or using a FPGA, a PLD, a PLA or a PAL, or using discrete logic elements or discrete circuit elements. The particular form each of the circuits, routines or applications of the system selective replacement 600 will take is a design choice and will be apparent to those skilled in the art.

Moreover, the selective replacement system 600 and/or each of the various circuits, routines or applications discussed above can each be implemented as software routines, managers or objects executing on a programmed general purpose computer, a special purpose computer, a microprocessor or the like.

The memory 630 shown in FIG. 13 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CDROM or DVD-ROM disk, and disk drive or the like.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for selectively printing a pixel at a print location having a missing color, the method comprising:
   determining if the missing color is to be printed for that pixel;
   determining, for a pixel that is to include the missing color, which colors are to be printed based on a color value to be printed for that pixel; and
   selecting, when the missing color is to be printed, at least one color to be printed in place of the missing color based on at least a pseudo-random process.

2. The method of claim 1, wherein selecting at least one color based on the pseudo-random process comprises selecting the at least one color based on a stochastic process.

3. The method of claim 1, further comprises determining a color value of at least one neighboring pixel, wherein selecting at least one color to be printed in place of the missing color includes selecting the at least one color based on the at least one determined color value of the at least one neighboring pixel.

4. The method of claim 1, further comprises replacing a color value of at least one neighboring pixel with another color value based on a stochastic process.

5. The method of claim 4, wherein replacing the color value of the at least one neighboring pixel comprises replacing the color value with another color value that corresponds with the at least one color to be printed in place of the missing color.

6. The method of claim 1, further comprises determining a type of image to be printed, wherein selecting the at least one color to be printed in place of the missing color includes selecting the at least one color based on the determined type of image to be printed.

7. The method of claim 1, further comprises not printing a color in the pixel with the missing color based on the pseudo-random process.

8. The method of claim 1, further comprising determining if a given print location has a missing color.

9. The method of claim 5, wherein determining if the given print location has a missing color comprises determining if at least one ejector associated with that given print location has failed.

10. The method of claim 1, further comprising:
    determining if at least one ejector is malfunctioning;
    disabling the at least one ejector that is malfunctioning from ejecting ink droplets.

11. A system that selectively prints a pixel having a missing color, the system comprising:
    a missing color value determining circuit, routine or application that determines if the missing color is to be printed for that pixel;
    a replacement color value determining circuit, routine or application that determines, for a pixel where less than all printable colors are available, which colors are to be printed based on the color value;
    a random generator circuit, routine or application that selects, when the missing color is to be printed, the colors to be printed based on randomness.

12. The system of claim 11, wherein the random generator circuit, routine or application includes a stochastic processing circuit, routine or application.

13. The system of claim 11, further comprising:
    a neighboring color value determining circuit, routine or application that determines a color value of a neighboring pixel; and
    the replacement color value determining circuit, routine or application that adjusts the colors to be printed based on the determined color value of the neighboring pixel.

14. The system of claim 11, further comprising:
    the random generator circuit, routine or application that selects at least one neighboring pixel of the pixel having missing color; and
    the replacement color value determining circuit, routine or application that adjusts the colors to be printed on the neighboring pixel based on the determined color value to be printed on the pixel with the missing value.

15. The system of claim 11, further comprising: an image type circuit, routine or application that determines a type of image to be printed; and
    the replacement color value determining circuit, routine or application that adjusts the colors to be printed based on the determined type of image to be printed.

16. The system of claim 11, further comprising:
    a diagnostic circuit, routine or application that performs diagnostics to determine whether one or more ejectors have malfunctioned or failed; and
    the replacement color value determining circuit, routine or application that determines the printable colors based on the diagnostics of the diagnostic circuit, routine or application.

17. The system of claim 16, wherein the system disables each failed or malfunctioning ejector diagnosed by the diagnostic circuit, routine or application.

* * * * *